United States Patent [19]

Ellis

[11] Patent Number: 4,743,039
[45] Date of Patent: May 10, 1988

[54] GRAND PIANO ACTION CRADLE

[76] Inventor: James F. Ellis, 125 N. Purdue Ave., Oak Ridge, Tenn. 37830

[21] Appl. No.: 918,044

[22] Filed: Oct. 14, 1986

[51] Int. Cl.$^4$ .............................................. B62B 3/02
[52] U.S. Cl. .................................. 280/42; 280/47.34; 280/79.1 A; 248/188.4
[58] Field of Search ............ 280/47.34, 640, 39, 280/42, 35, 639, 79.3, 79.1 A, 79.1 R, 47.35, 659, 651; 248/157, 173, 188.4; 269/296; 254/98, 100, 102; 84/458

[56] References Cited

U.S. PATENT DOCUMENTS

| | | | |
|---|---|---|---|
| 189,531 | 4/1877 | Voorhees | 280/35 |
| 612,523 | 10/1898 | Martin | 280/651 |
| 1,581,352 | 4/1926 | Kuen | 280/79.3 X |
| 1,918,604 | 7/1933 | Johnson | 280/79.3 |
| 2,161,578 | 6/1939 | Johnson | 280/79.3 X |
| 2,534,367 | 12/1950 | Perrotta et al. | 280/79.1 A X |
| 3,222,030 | 12/1965 | Thorpe | 254/100 |
| 3,637,232 | 1/1972 | Bourgraf et al. | 280/640 X |
| 4,165,088 | 8/1979 | Nelson | 280/79.3 X |

Primary Examiner—David M. Mitchell
Assistant Examiner—Tamara L. Finlay

[57] ABSTRACT

The invention comprises a pair of horizontal runners held above a foldable X-frame dolly by means of adjustable vertical supports to provide placement of the tops of the runners at the exact height of the action bed of a grand piano to allow the piano's action to be drawn directly out upon the runners, supported by the assembly, and moved about for servicing without the need of ever lifting the action, and to be re-installed in the piano in the same manner.

1 Claim, 2 Drawing Sheets

GRAND PIANO ACTION CRADLE

BACKGROUND OF THE INVENTION

The invention described herein was made during my private practice as a piano tuner-technician.

FIELD OF THE INVENTION

This invention relates to fixtures and equipment used in the servicing of pianos, and in particular, to work with grand pianos.

OBJECTIVES OF THE INVENTION

Pianos are routinely serviced (tuned and regulated) on site. When the action of a grand piano is to be serviced, on site as opposed to detailed shop work, it is customary for the technician to simultaneously withdraw and lift the action from the piano, and then to place it upon a flat surface. This requires the technician to lift, stoop, and lean forward, all at the same time, which strains the back. Matters are made worse at times when there is no surface suitable for receiving the action. At such times, the technician sometimes places the action on top of the piano, requiring additional lifting while leaning at an angle. If the piano is a large concert grand, this can be a troublesome task, especially for a small person. The objectives of this invention are as follows:

1. To provide a light, portable, sturdy means for supporting a grand piano action (keys and working parts) while it is being serviced on location.
2. To provide adjustable means whereby the technician may withdraw and replace the piano's action directly without the need of any lifting whatsoever.
3. To provide portability for the action being serviced.

BRIEF SUMMARY OF THE INVENTION

This invention utilizes a foldable X-frame base, usually with casters, as its main structure. One caster is under each of the four arms of the frame, near the end. The X-frame has a single pivot through its center. In one embodiment of the invention, four removable tubular members extend upward from near the ends of the base. There are two removable runners, or supports, for receiving the piano's action. Each runner receives a threaded member, at or near its end, and at right angles to its axis. Each threaded member is fitted with a nut. To place the device in service, the X-frame base is unfolded, the casters put upon the floor, the four vertical supports inserted into their flanges, and the studs of the runners placed in the open ends of the supports. The heights of the runners are then adjusted by means of the nuts on the studs.

DETAILED DESCRIPTION OF THE INVENTION

Figure 1:
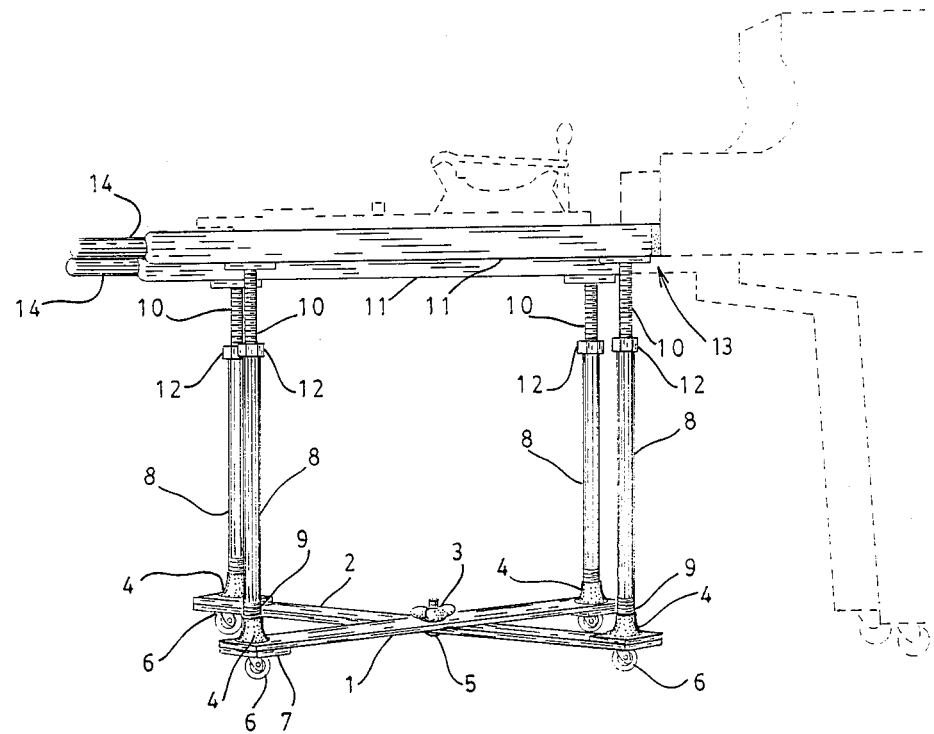
FIG. 1 is a profile view of the complete assembly in position with a grand piano, with the piano's action withdrawn and upon it.

FIG. 1 shows the completed assembly placed against a grand piano, with the piano's action resting upon it.

Figure 2:
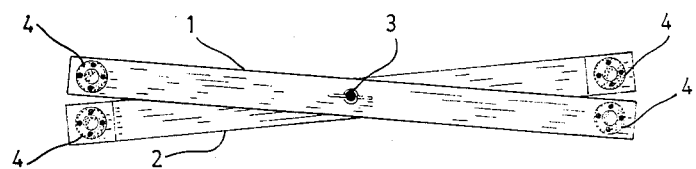
FIG. 2 is a view of the top of the X-frame in folded position.

In FIG. 2, the top member of the X-frame, 1, is secured to the bottom member, 2, by means of a bolt through the center of both, and tightened by a thumb nut, 3. The members are of wood, or other suitable material. A threaded flange, 4, is attached to the upper side of each arm of the frame near the end.

Figure 3:
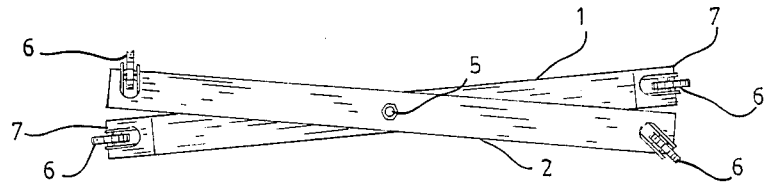
FIG. 3 is a view of the bottom of the X-frame base in folded position.
Figure 4:
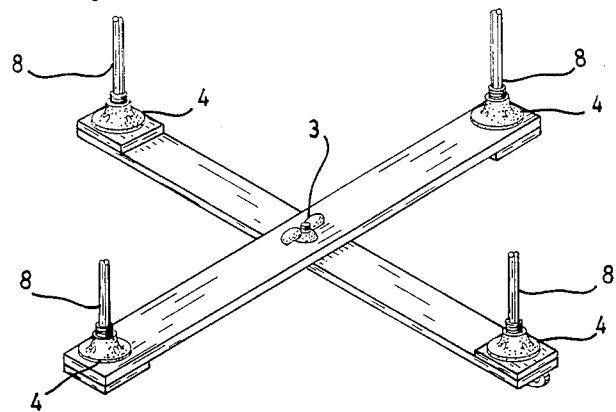
FIG. 4 is a view of the X-frame base, unfolded, with vertical supports attached.
Figure 5:
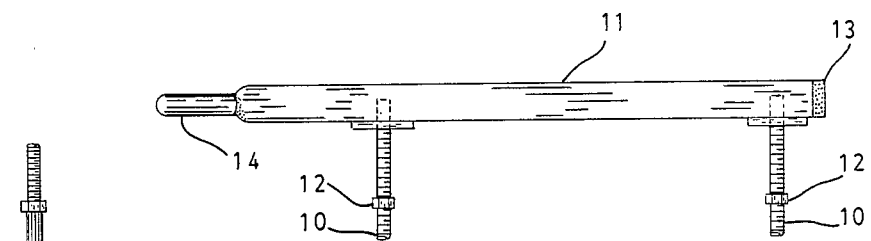
FIG. 5 is a profile view of one of the two runners, with threaded studs attached.
Figure 6:
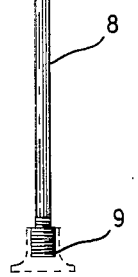
FIG. 6 is a view of one of the four tubular vertical supports.

In FIG. 3, the head of the bolt, 5, is in the center of the "X". A caster, 6, is mounted directly under each flange. The casters on the upper member, 1, are spaced from it by means of blocks, 7, so that their height will be the same as that of those on lower member, 2. To assemble the device, thumb nut, 3, is loosened, and members 1 and 2 are spread apart as shown in FIG. 4. The four supports, preferable of thin-walled metal tubing, 8, with threaded collars on their lower ends 9, (FIG. 6) are threaded into flanges 4 as shown in FIG. 4. Threaded studs 10 of runners 11 (FIG. 5) are inserted into the upper ends of tubular supports 8, and thumb nut 3 is tightened to secure the X-frame base. The completed assembly is as shown in FIG. 1.

The exact height of the tops of each of the two runners 11 is adjusted by nuts 12 which rest upon the tops of tubular supports 8. In this manner, the runners are adjusted to the exact height of the action bed of the piano. Pads 13 are attached to the ends of the runners to protect the finish of the piano.

Figure 7:
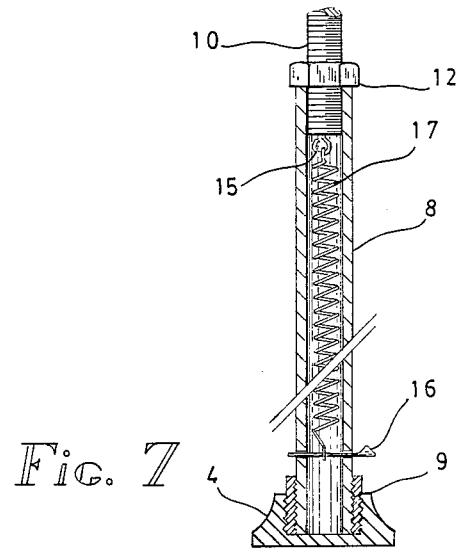
FIG. 7 is a detail of a variation of the support shown in FIG. 6, in which a spring retains the threaded stud in the support.

The preferred method for attaching the vertical supports 8 to the base members 1 and 2 is by mating threads. However, unthreaded mating parts may be used instead. Also, the threaded studs 10 may be left attached to the runners 11, or they may be held to the supports 8 by means of tension springs. FIG. 7 shows the embodiment in which the studs 10 remain with the tubular supports 8 and are held in place by tension springs 17 attached to hook 15, in turn attached to stud 10, and pin 16 inserted through holes in the support. In final assembly, runners 11 are placed upon studs 10, with studs inserted into the blind holes of the runners. If the user preferrs, the pin 16 may be removed, releasing the spring, which in turn can be removed and studs 10 permanently glued into their respective holes in runners 11.

To remove the piano's action, the padded ends of runners 11 are placed against the front of the piano, nuts 12 are adjusted until the tops of runners 11 are at the exact height of the action bed of the piano, and the action is pulled out directly upon the runners. The device carrying the action may then be rolled about. Hand grips 14 are provided for this purpose. When the service has been completed, the technician rolls the assembly up to the piano, places pads 13 against the front of the piano, and pushes the action back into its normal position in the piano. The technician then removes the studs 10 of runners 11 from supports 8 (or removes the runners from the studs if they are to be held in supports 8 by springs), removes tubular supports 8 from flanges 4, loosens thumb nut 3, folds X-frame base members 1 and 2 together as in FIGS. 2 and 3, tightens thumb nut 3 to hold the members in their folded position, and packs the unit away for further use later.

I claim as my invention:

1. In a device for supporting the action of a grand piano, a combination comprising two crossed horizontal members supported at their four ends by casters, pivoted at their common centers by a bolt, and having threaded flanges attached to their upper surfaces, four vertical supports of tubular material having threaded collars at their lower ends mating with said threaded flanges, four threaded studs each extending from the upper end of one of said supports, held in place by a tension spring engaged between an eye in the lower end of said threaded stud and a pin inserted through a hole near the lower end of said support, and restrained from fully entering said support by a nut threaded upon said threaded stud and pressing against said upper end of said support, and two horizontal runners with blind holes in their lower surfaces spaced and fitting over the tops of said studs when said crossed horizontal members are pivoted in an open position.

* * * * *